United States Patent [19]
Gregg et al.

[11] Patent Number: 5,979,130
[45] Date of Patent: Nov. 9, 1999

[54] CONNECTOR WITH CONCAVE SEAT

[75] Inventors: Robert C. Gregg, Yorba Linda; William F. Leek, Anaheim; Alfred D. Commins, Danville, all of Calif.

[73] Assignee: Simpson Strong-Tie Company, Inc., Pleasanton, Calif.

[21] Appl. No.: 08/729,056

[22] Filed: Oct. 10, 1996

[51] Int. Cl.⁶ .................................................... E04B 1/38
[52] U.S. Cl. ............................... 52/295; 52/296; 52/702; 52/714; 403/190; 403/232.1
[58] Field of Search .............................. 52/295, 296, 289, 52/702, 714; 403/190, 232.1

[56] References Cited

U.S. PATENT DOCUMENTS

| | | |
|---|---|---|
| D. 224,083 | 7/1972 | Gilb . |
| 573,452 | 12/1896 | Delahunt . |
| 1,578,947 | 3/1926 | Alber . |
| 2,169,474 | 8/1939 | Pederson . |
| 2,321,221 | 6/1943 | Linehan . |
| 3,413,773 | 12/1968 | Fitzgerald . |
| 4,192,118 | 3/1980 | Gilb . |
| 4,321,776 | 3/1982 | Delight . |
| 4,665,672 | 5/1987 | Commins . |
| 4,744,192 | 5/1988 | Commins . |
| 4,825,621 | 5/1989 | Jensen . |
| 4,875,314 | 10/1989 | Boilen . |
| 5,092,097 | 3/1992 | Young . |
| 5,104,252 | 4/1992 | Colonias . |
| 5,249,404 | 10/1993 | Leek . |
| 5,375,384 | 12/1994 | Wolfson . |
| 5,467,570 | 11/1995 | Leek . |

OTHER PUBLICATIONS

Simpson Strong–Tie Company, Inc. catalog, 1966, p. 13.
Simpson Strong–Tie Company, Inc. catalog, 1967, p. 13.
Simpson Strong–Tie Company, Inc. catalog, 1968, p. 9.
Simpson Strong–Tie Company, Inc. catalog, 1970, p. 16.
Simpson Strong–Tie Company, Inc. catalog, 1979, p. 5.
Simpson Strong–Tie Company, Inc. catalog, 1983, p. 7.
Connectors for Wood Construction, Simpson Strong–Tie Co. catalog, 1986, p. 7.
Connectors for Wood Construction, Simpson Strong–Tie Co. catalog, 1990, p. 9.
Simpson Strong–Tie Co., catalog, 1993, p. 13.

*Primary Examiner*—Beth Aubrey
*Attorney, Agent, or Firm*—James R. Cypher

[57] ABSTRACT

A connector having a concave seat member for connecting a first building structural member to a second building structural member in conjunction with fasteners and an anchor member to resist forces on buildings imposed by earthquakes, hurricanes, tornadoes and other similar cataclysmic forces. A connector constructed in accordance with the present invention consists of a concave seat member, formed with an opening for receiving an anchor member therethrough to attach the connector to a second building structural member such as a foundation, a first side member connected to the concave seat member, a second side member connected to the concave seat member, and a back member connected to the first and second side members. The back member attaches with fasteners to a first building structural member such as stud in a framed shear wall.

15 Claims, 5 Drawing Sheets

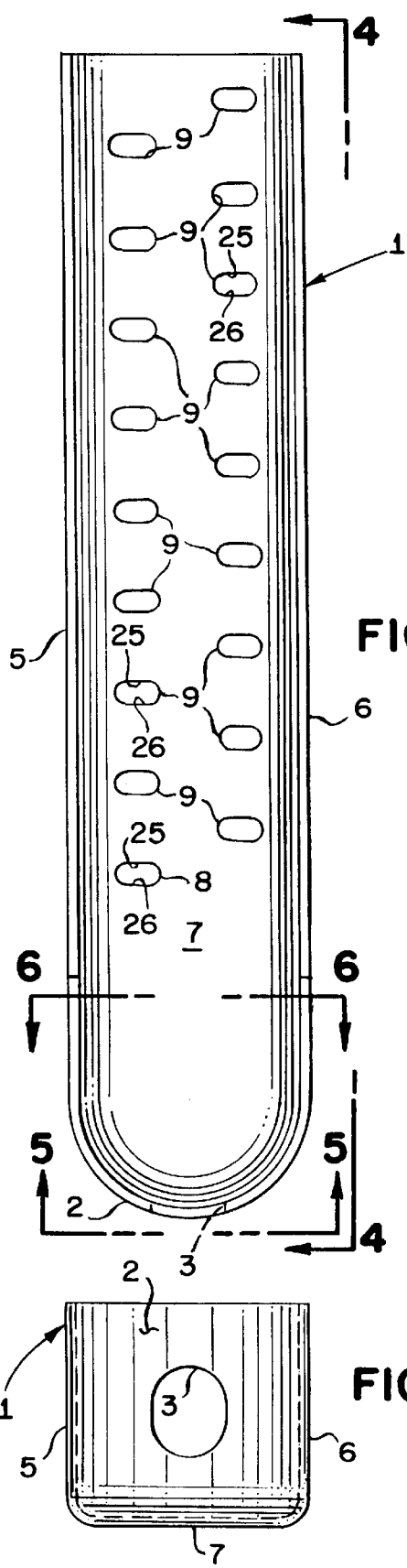
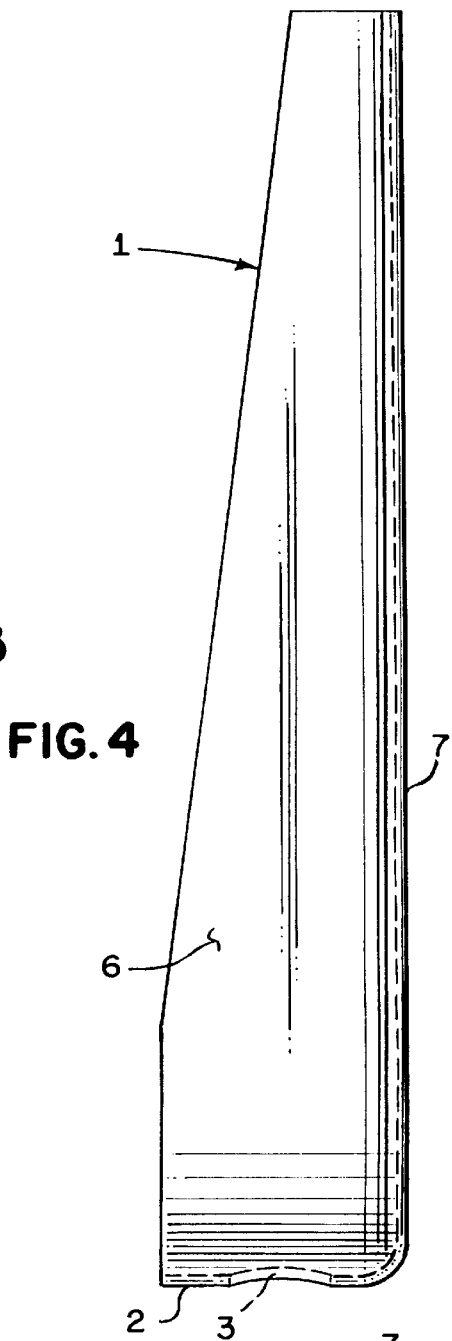
FIG. 3
FIG. 4
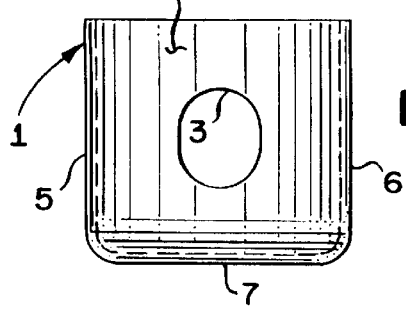
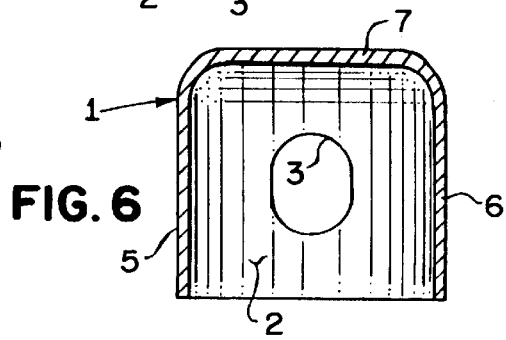
FIG. 5
FIG. 6

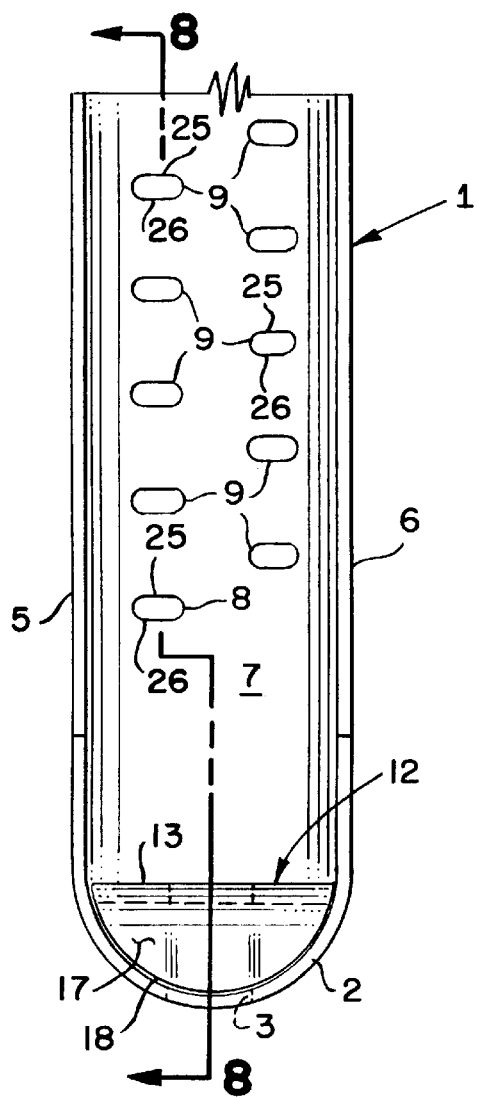
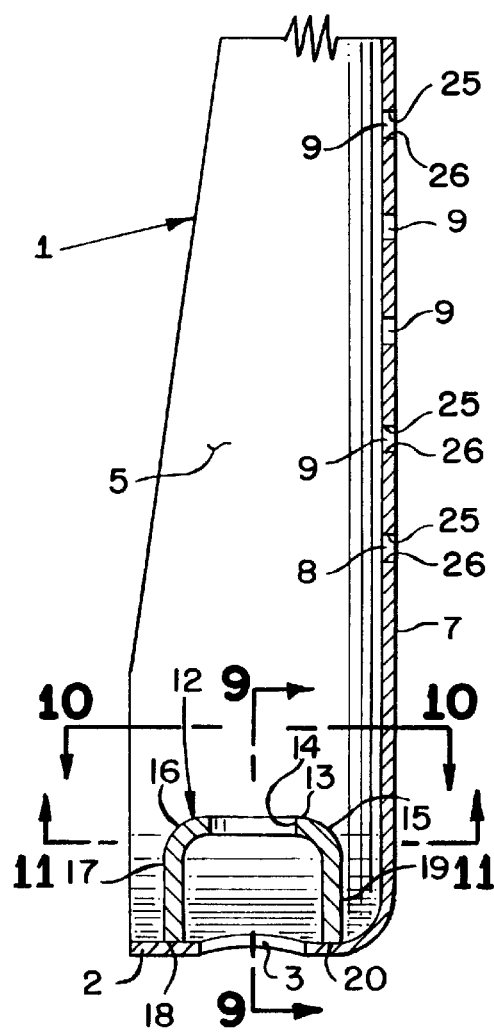
FIG. 7  FIG. 8
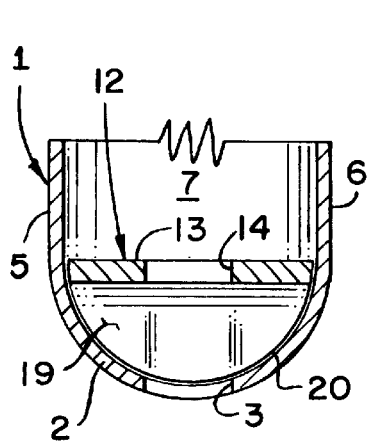
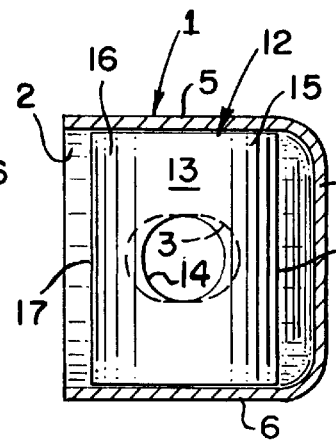
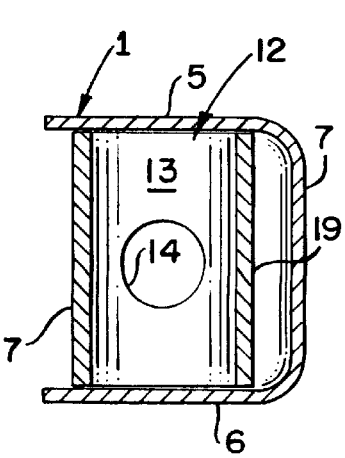
FIG. 9  FIG. 10  FIG. 11

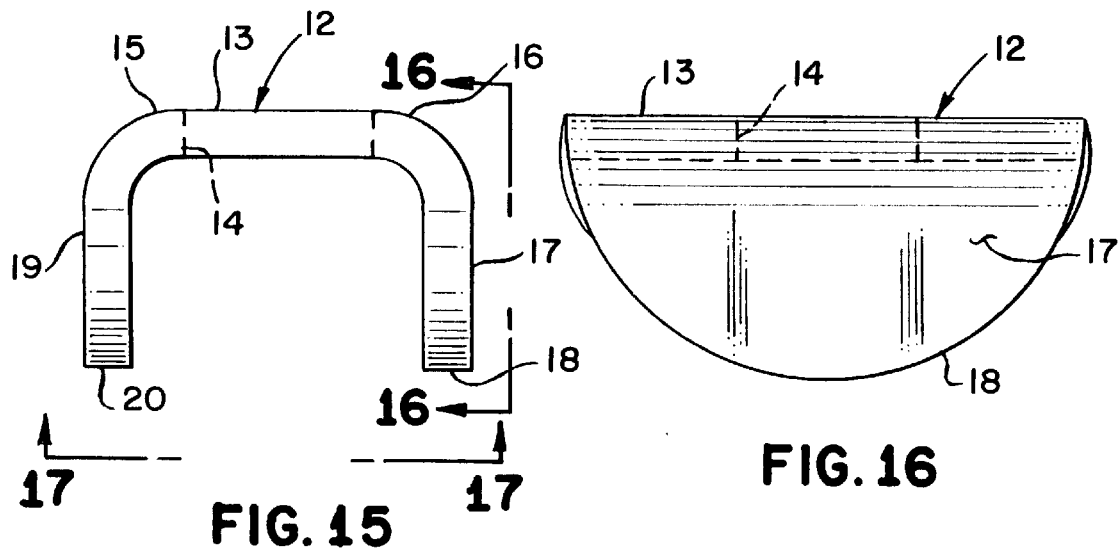
FIG. 15
FIG. 16
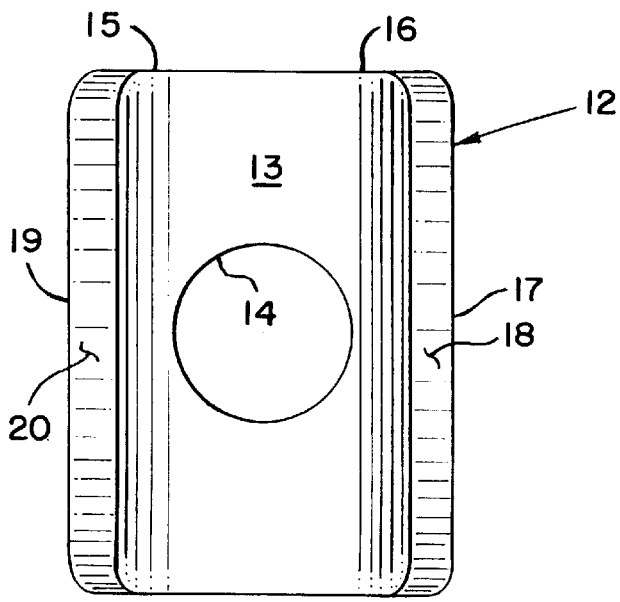
FIG. 17
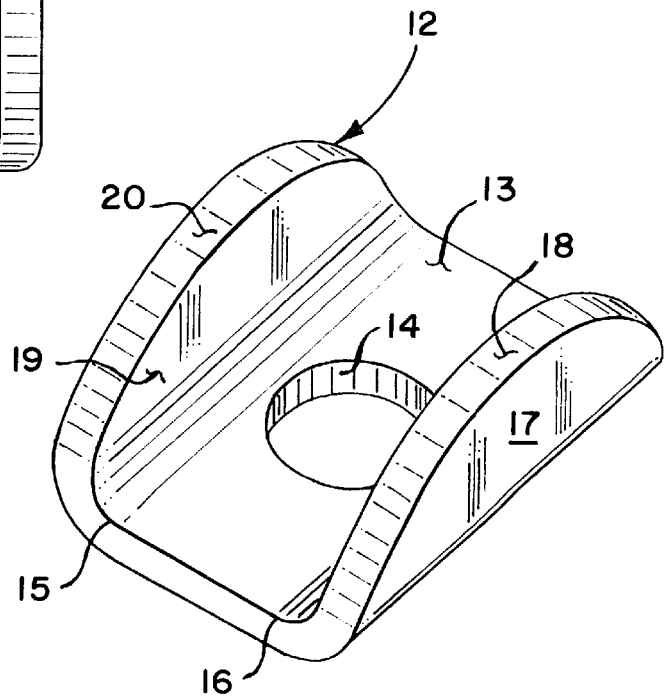
FIG. 14

CONNECTOR WITH CONCAVE SEAT

BACKGROUND

This invention relates to a connector for anchoring a first building structural member to a second building structural member. The connector works in conjunction with a separate anchor member that is received by or is attached to the second building structural member and fastener means for attaching the connector to the first building structural member.

Earthquakes, hurricanes, tornadoes, and floods impose forces on a building that can cause structural failure. To counteract these forces, it has become common practice to strengthen or add ties between the structural members of a building in areas where such cataclysmic forces can occur. For example: framed walls can be attached to the foundation rather than merely rest on it; connections between the framed walls of each floor can be strengthened; and joists can be connected to both their headers and the wall that supports the header. One of the most common connectors designed for this application is called a holdown by the inventor. Holdowns are commonly used to anchor framed walls to the foundation.

Early holdowns were constructed from two or more separate pieces of metal welded together. These holdowns had to be painted to prevent rusting. They were heavy and costly to produce.

State of the art holdowns are made from galvanized sheet metal formed on progressive die machines that require no welding or painting. See U.S. Pat. No. 4,665,672, granted May 19, 1987, to Commins, Gilb and Littleton; U.S. Pat. No. 5,092,097 granted Mar. 3, 1992, to Young; and U.S. Pat. No. 5,249,404, granted Oct. 5, 1993, to Leek and Commins. These advancements have reduced the cost to make holdowns while increasing their ability to withstand tension forces. However, recent severe earthquakes in San Francisco, Los Angeles, and Kobe, Japan, demonstrate that holdowns capable of being mass produced and installed inexpensively should be made even stronger for many connections.

All the holdown connectors of the prior art that work in conjunction with a separate anchor member work in a similar fashion. The anchor member attaches at the seat of the connector. This seat is connected to a back member. The back member attaches to the first building structural member, generally a stud in a framed wall. Most holdown connectors have one or more side members to increase the strength of the connector or to connect the seat member to the back member.

All prior art holdown connectors that attach to a separate anchor member share a common characteristic: they are formed with a planar or flat seat. Furthermore, the interfaces between the seat member and the back and side members are generally perpendicular.

When sufficiently strong tension forces are exerted on structural members attached by prior art holdown connectors the seat of the connector will deflect, and the back member, and side members, if present, will bend inwardly, that is towards the attachment point of the seat with the anchor member. The situation is somewhat analogous to having slack in a rope before it is pulled taunt. This deflection of the seat and back and side members effectively lengthens the holdown connector, loosening the connection between the joined structural members. The effectiveness of the holdown is lessened.

Accordingly, there is a continuing need in the art for an improved connector which can be inexpensively made, and easily installed which better withstands forces imposed by cataclysmic occurrences.

SUMMARY OF THE INVENTION

The object of the present invention is to provide a connector that better withstands tension forces than the prior art while still being economical to produce and install.

The object of making a stronger connector is achieved by forming the seat member of the connector with a concave shape. The concave seat member of the present invention reduces excess structural material that is formed perpendicular to the direction of tension forces, thereby reducing the amount of material that is displaced by severe tension loads.

The object of making a holdown that is economical to produce is achieved by utilizing a design that is formed from a blank of galvanized sheet metal on standard die press machinery, eliminating costly secondary operations such as painting and welding.

The object of making a holdown that is easy to install is achieved by utilizing a design that is amenable to current building practices.

These and other objects of the present invention will become apparent, with reference to the drawings, the description of the preferred embodiment and the claims.

BRIEF DESCRIPTION OF THE DRAWINGS

FIG. 3 is front elevation view of the connector of FIG. 1.

FIG. 4 is a side elevation view of the connector of FIG. 1 taken along line 4—4 of FIG. 3.

FIG. 5 is a bottom elevation view of the connector of FIG. 1 taken along line 5—5 of FIG. 3.

FIG. 6 is a top plan view of a section of the connector of FIG. 1 taken along section line 6—6 of FIG. 3.

FIG. 7 is a front elevation view of a section of the connector of FIG. 1, shown with an n-shaped washer. FIG. 8 is a side view of a cross section of the connector of FIG. 1, shown with an n-shaped washer, taken along section line 8—8 of FIG. 7.

FIG. 9 is a front view of a section of the connector of FIG. 1, shown with an n-shaped washer, taken along section line 9—9 of FIG. 8.

FIG. 10 is a top plan view of a section of the connector of FIG. 1, shown with an n-shaped washer, taken along section line 10—10 of FIG. 8.

FIG. 11 is a bottom view of a section of the connector of FIG. 1, shown with an n-shaped washer, taken along line 11—11 of FIG. 8.

FIG. 14 is a perspective view of an n-shaped washer formed with flanges having rounded edges to fit in registration with the rounded form of the concave seat of the present invention.

FIG. 15 is a side elevation view of the n-shaped washer of FIG. 14.

FIG. 16 is a front elevation view of the n-shaped washer of FIG. 14.

FIG. 17 is a bottom elevation view of the n-shaped washer of FIG. 14.

DESCRIPTION OF THE PREFERRED EMBODIMENT

Figure 1:
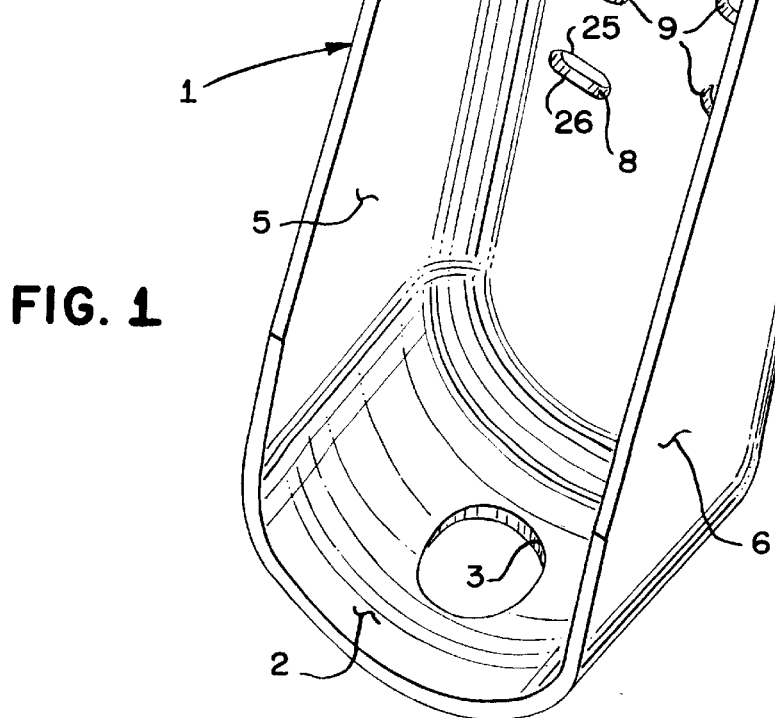
FIG. 1 is a perspective view of a connector constructed in accordance with the present invention.

As seen in FIG. 1, a connector 1 constructed in accordance with the present invention consists of a concave seat member 2 formed with an opening 3 for receiving an anchor member 4 therethrough, a first side member 5 connected to the concave seat member 2, a second side member 6 connected to the concave seat member 2, and a back member 7 connected to the first and second side members 5 and 6. The connector 1 is attached to a first building structural member 11 with fastener means 10 at the back member 7.

In the present invention, the seat 2 of the connector 1 is formed as a concave member. As seen in FIG. 1, in the preferred form of the invention the concave seat member 2 is curvilinear, but angular variations are also considered to be within the scope of the present invention. Furthermore, in the preferred form of the invention, the concave seat member 2, the back member 7 and the first and second side members 5 and 6 form a single continuous member, but it will be appreciated that modifications can be made without departing from the scope of the present invention.

One alternate form of the connector 1 constructed in accordance with the present invention is suggested by U.S. Pat. No. 4,665,672, granted May 19, 1987 to Commins, Gilb and Littleton. In the alternate form the back member 7 consists of two plates, rather than a single member. More specifically, a first back plate integrally connects to the first side member 5 and a second back plate integrally connects to the second side member 6.

Another alternate form of the connector 1 constructed in accordance with the present invention is suggested by U.S. Pat. No. 4,825,621, granted May 2, 1989 to Jensen, and also by U.S. Pat. No. 5,092,097, granted Mar. 3, 1992 to Young. In this alternate form the concave seat member 2 consists of two overlapping seat plates. More specifically, a first concave seat plate is integrally attached to the first side member 5 and a second, overlapping concave seat plate is integrally attached to the second side member 6.

Still another alternate form constructed in accordance with the present invention is suggested by U.S. Pat. No. 5,467,570, granted Nov. 21, 1995 to Leek. In this alternate form the concave seat member 2 consists of three overlapping seat plates, the third plate being integrally connected to the back member 7.

As seen in FIG. 1, in the preferred embodiment of a connector 1 constructed in accordance with the present invention, the back member 7 is connected to the concave seat member 2. Furthermore, the preferred embodiment is formed by drawing a sheet metal blank over a mold. This results in the integral connection of the back member 7, the side members 5 and 6, and the concave seat member 2. The integral connection between the side members 5 and 6, the back member 7, and the concave seat member 2 gives the preferred embodiment added strength to resist both tension and compression forces.

Referring to FIG. 1, in the preferred embodiment the first and second side members 5 and 6 of the connector 1 are formed generally parallel to each other. The first and second side members 5 and 6 can also be formed so that they converge towards each other as the distance from the concave seat member 2 increases.

Figures 12, 13:
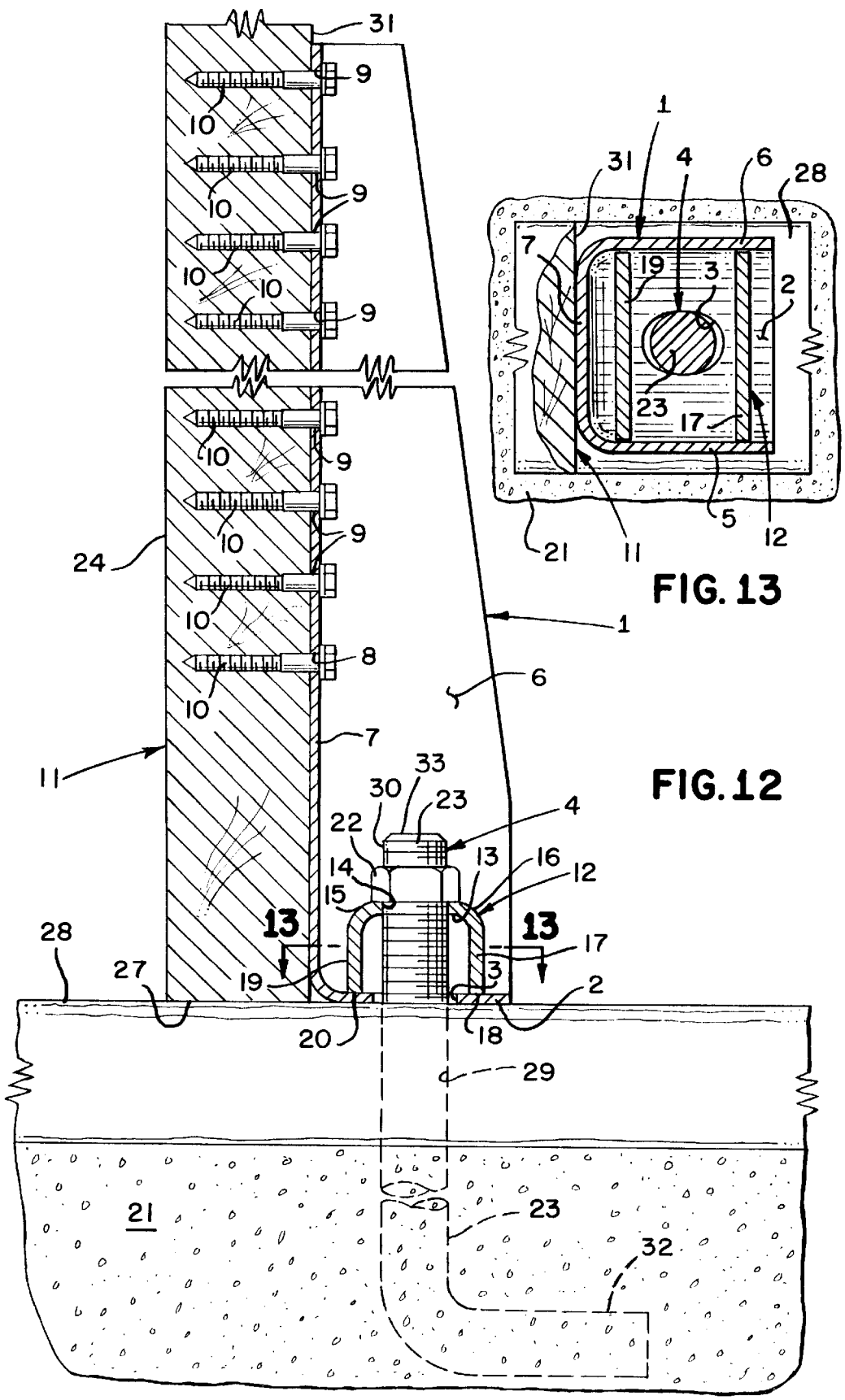
FIG. 12 is a side view of a section of the connector of FIG. 1, shown with an n-shaped washer. The holdown of FIG. 1 is shown fastened to a wooden stud and to a concrete foundation.
FIG. 13 is a top plan view of a section of the connector of FIG. 1, shown with an n-shaped washer, taken along line 13—13 of FIG. 12.

Referring to FIG. 12, preferably a connector 1 formed in accordance with the present invention is used with a substantially rigid washer member 12. As best seen in FIG. 17, the washer member 12 is formed with a receiving portion 13 having an opening 14 for receiving the anchor member 4 therethrough.

In one embodiment this substantially rigid washer member 12 can sit proximate the first side member 5 and the second side member 6 to provide lateral bracing to the first and second side members 5 and 6 when the connector 1 is under tension loads.

As seen in FIG. 7, in the preferred embodiment the washer member 12 sits proximate the concave seat member 2, rather than sitting proximate the first and second side members 5 and 6. In the preferred embodiment the washer member 12 provides similar lateral bracing as when the washer member 12 sits proximate the first and second side members 5 and 6. This is because the receiving portion 13 of the washer member 12 is of a width that closely fits between the first side member 5 and the second side member 6. Thus, the concave seat member 2 that receives the washer member 12 is braced at points where it is as substantially as wide as the distance between the first and second side members 5 and 6.

In one embodiment, the substantially rigid washer member 12 can be formed as a solid member with an opening 14 for receiving the anchor member 4 therethrough. As noted above, the receiving portion 13 should be wide enough so that the washer member 12 closely fits between the first side member 5 and the second side member 6. Furthermore, the washer member 12 should be formed to be in substantial registration with the concave seat member 2 to provide improved bracing of the concave seat member 2. The preferred embodiment of the washer member 12, however, is n-shaped. See FIG. 15.

Figure 2:
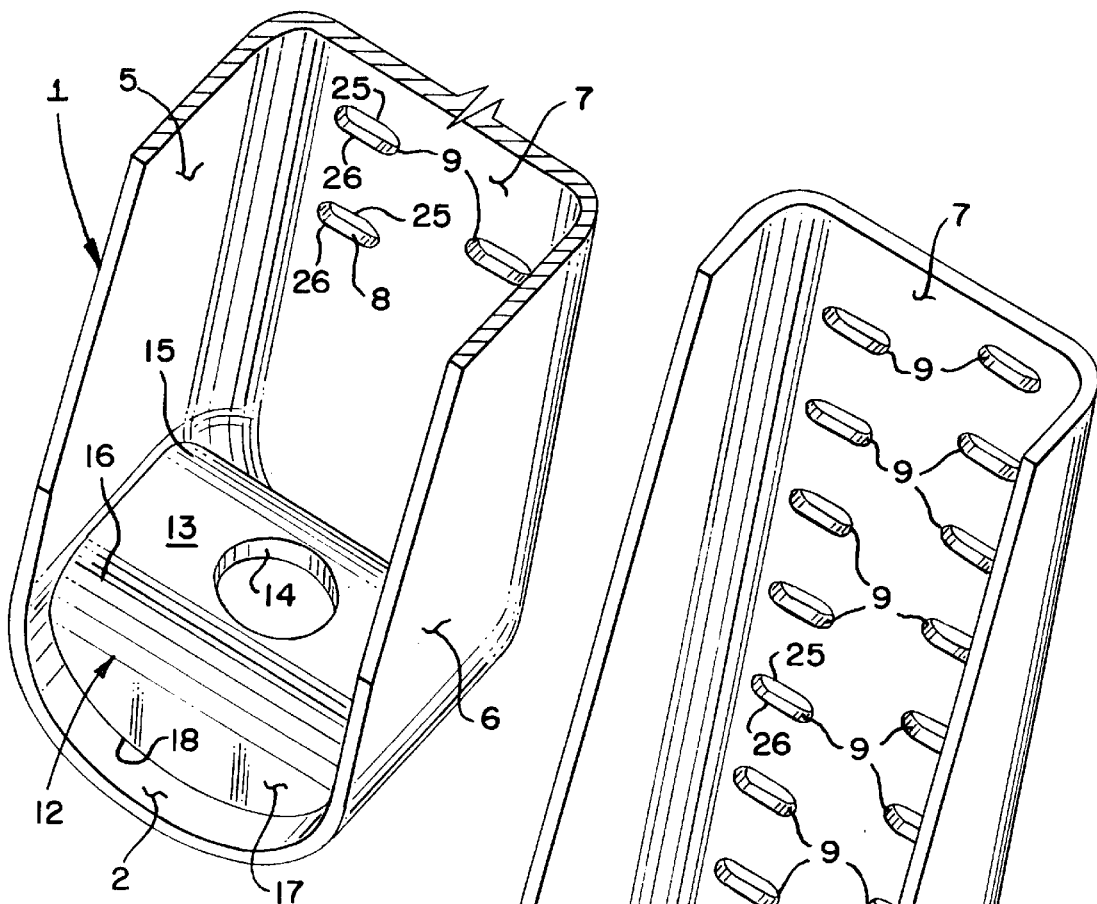
FIG. 2 is a perspective view of a section of the connector of FIG. 1. The connector is shown with an n-shaped washer.

As best seen in FIG. 2, the preferred n-shaped washer member 12 has a receiving portion formed with a back edge 15 and an outward edge 16. Referring to FIG. 14, an outward flange 17 integrally connects to the outward edge 16 of the receiving portion 13 and extends towards the concave seat member 2. As seen in FIG. 7, the outward flange 17 has an outward flange base 18 that is formed to be in registration with the concave seat member 2. Similarly, a back flange 19 integrally connects to the back edge 15 and extends towards the concave seat member 2. The back flange 19 has a back flange base 20 that is formed to be in registration with the concave seat member 2.

To summarize, the preferred embodiment of a connector 1 constructed with a concave seat member 2 is used with a substantially rigid n-shaped washer member 12. In the preferred embodiment, the concave seat member 2 is formed with an opening 3 for receiving an anchor member 4 therethrough to attach the connector 1 to a second building structural member 21. A first side member 5 integrally connects to the concave seat member 2. A second side member 6 integrally connects to the concave seat member 2. A back member 7 integrally connects to the first and second side members 5 and 6, and the concave seat member 2. The back member 7 attaches to the first building structural member 11 with fastener means 10. An n-shaped, substantially rigid washer member 12 sits proximate the concave seat member 2 and is formed with a receiving portion 13 having an opening 14 for receiving the anchor member 4 therethrough. The receiving portion 13 is dimensioned to closely fit between the first side member 5 and the second side member 6 to provide lateral bracing when the connector 1 is under tension loads. The receiving portion 13 is formed with a back edge 15. A back flange 19 integrally connects to the back edge 15 and extends towards the concave seat member 2. The back flange 19 has a back flange base 20 that is formed to be in registration with the concave seat member 2. The receiving portion 13 is also formed with an outward edge 16. An outward flange 17 integrally connects to the outward edge 16 and extends towards the concave seat member 2. The outward flange 17 is formed with an outward flange base 18 that is formed to be in registration with the concave seat member 2.

Referring to FIG. 12, the anchor member 4 can consist of an anchor bolt 23 and a holding means 22 attached thereto. The anchor bolt 23 can be formed with a distal end 32 and a proximal end 33. When the second building structural member 21 is a concrete foundation, the distal end 32 is embedded in the second building structural member 21, as shown in FIG. 12. The proximal end 33 of the anchor bolt 23 can be formed with a threaded portion 30 to which the holding means 22, generally a threaded nut, can releasably attach, completing the anchor member 4.

Referring to FIG. 1, the back member 7 of the preferred embodiment is formed with a plurality of openings 8 and 9 to receive fastener means 10.

Referring to FIG. 12, when the first building structural member 11 is made of wood, these fastener means 10 are preferably wood screws with cutting points. They can also be nails, threaded bolts with nuts, lag screws, or steel screws to name a few variations. The use of self-drilling wood screws as fastener means 10 eliminates the need for the added step of drilling a hole for a regular bolt that has no drilling point. Also, self-drilling wood screws need not pass all the way through the first building structural member 11, so access to the back side 24 of the first building structural member 11 is not necessary. Self-drilling wood screws create a stronger connection than nails, and self-drilling wood screws can be installed almost as quickly as nails if an electric-powered or pneumatic wrench is used.

Referring to FIG. 3, the openings 8 and 9 in the back member 7 of the preferred embodiment are preferably obround in shape with the long side edges 25 and 26 running laterally. These obround openings 8 and 9 accommodate difficulties in fastening the connector 1 to the first building structural member 11, such as when the first building structural member 11 is a wooden stud that has knots or when there is a misalignment of the anchor member 4 and the first building structural member 11. Fastener means 10 are sized for close registration with the side edges 25 and 26 of the openings 8 and 9.

Referring to FIG. 3, in the preferred embodiment, the lowest opening 8 in the back member 7 is spaced from the bottom of the concave seat member 2 by a selected distance. This distance is dependent on the fastener means 10 to be used with the connector 1 and the form and composition of the first building structural member 11 to which the back member 7 connects. Splitting of wooden structural members is a problem if fastener means 10 that pierce the first building structural member 11 are placed too close to the end 27 of the first building structural member.

When the first building structural member 11 is made of steel the connector can be welded to the first building structural member 11, thus the back member 7 need not be formed with openings 8 and 9.

Referring to FIG. 5, preferably, the opening 3 in the concave seat member 2 is obround in shape to accommodate misalignment of the anchor member 4 and the first building structural member 11.

The preferred embodiment is formed from light gauge galvanized sheet metal. This permits the connector 1 to be made on standard, automated machinery common in the sheet metal connector industry. Furthermore, the preferred form requires no secondary production operations after it is formed such as welding or painting. This further reduces manufacturing costs.

FIG. 12, shows a typical use of the preferred embodiment. In FIG. 12 the first building structural member 11 is a vertical stud of a framed wall and the second building structural member 21 is a concrete foundation. The present invention may also be used to transfer tension loads between floors of a framed structure, or to tie joists to masonry or concrete walls, to name but a few applications.

Installation of the connector 1 and n-shaped washer member 12 of the preferred embodiment to form a foundation-to-wooden-stud connection is illustrated by FIG. 12. It is to be noted that the connection also secures the transfer member 28, or mudsill as it is generally known, to the second building structural member 21.

First, an anchor bolt 23 is embedded in the second building structural member 21, which is commonly a poured concrete foundation. This can be done by placing the distal end 32 of the anchor bolt 23 in the wet concrete or by forming the second building structural member 21 with the proximal end 33 of the anchor bolt 23 protruding from it. An opening 29 is drilled in the transfer member 28 and the anchor bolt 23 is inserted therethrough with the threaded portion 30 of the proximal end 33 of the anchor bolt 23 exposed above the top of the transfer member 28.

The n-shaped washer member 12 is received by the concave seat member 2, with the outward and back flange bases 18 and 20 of the n-shaped washer member 12 sitting on the concave seat member 2 in close registration, the receiving portion 13 of the washer member 12 having been closely received between the first and second side members 5 and 6.

The threaded portion 30 of the anchor bolt 23 is inserted through the opening 3 in the concave seat member 2, and the opening 14 in the receiving portion of the n-shaped washer member 12. The back member 7 of the holdown connector 1 is set against the front side 31 of the first building structural member 11. Fastener means 10 are driven into the first building structural member 11 through the openings 8 and 9 in the back member 11, forming a tight fit between the back member 7 of the connector 1 and the first building structural member 11. A holding means 22 is then placed on the threaded portion 30 of the anchor bolt 23 and tightened down, completing the anchor member 4, and the connection. Optimally, the concave seat member 2 should rest on the transfer member 28, as shown in FIG. 12.

We claim:

1. A connector for tying a first building structural member to a second building structural member in conjunction with fastener means and an anchor member, said connector comprising:

a. a concave seat member, having a lowest point and a midpoint, said concave seat member being formed with an opening substantially at said lowest point of said concave seat member which is also substantially said midpoint of said concave seat member, said opening formed for receiving said anchor member therethrough to attach said connector to said second building structural member, said concave seat member tapering towards said opening;

b. a first side member connected to said concave seat member;

c. a second side member connected to said concave seat member; and d. a back member connected to said first and second side members, said back member being formed to interface with said fastener means to attach said back member to said first building structural member.

2. The connector of claim 1, wherein:

said back member is connected to said concave seat member.

3. The connector of claim 1, wherein:

a. said first side member is integrally connected to said concave seat member;

b. said second side member is integrally connected to said concave seat member;

c. said back member is integrally connected to said first and second side members; and d. said back member is integrally connected to said concave seat member.

4. The connector of claim 3, wherein:

said second side member ranges in position from generally parallel to convergent with said first side member.

5. The connector of claim 3, comprising:

a substantially rigid washer member located proximate said first side member and said second side member to provide lateral bracing to said first and second side members when said connector is under tension loads, said washer member formed with a receiving portion having an opening for receiving said anchor member therethrough.

6. The connector of claim 3, comprising:

a substantially rigid washer member located proximate said concave seat member and formed with a receiving portion having an opening for receiving said anchor member therethrough.

7. The connector of claim 6, wherein:

said receiving portion of said washer member is dimensioned to closely fit between said first side member and said second side member to provide lateral bracing when said connector is under tension loads.

8. The connector of claim 7, wherein:

said washer member has a base formed to be in registration with said concave seat member.

9. The connector of claim 7, wherein said washer member is n-shaped and comprises:

a. said receiving portion formed with a back edge and an outward edge;

b. a back flange integrally connected to said back edge and extending towards said concave seat member, said back flange formed with a back flange base that is formed to be in registration with said concave seat member; and c. an outward flange integrally connected to said outward edge of said receiving portion and extending towards said concave seat member, said outward flange formed with an outward flange base that is formed to be in registration with said concave seat member.

10. A connector for tying a first building structural member to a second building structural member in conjunction with fastener means and an anchor member, said connector comprising:

a. a concave seat member, having a lowest point and a midpoint, said concave seat member being formed with an opening substantially at said lowest point of said concave seat member which is also substantially said midpoint of said concave seat member, said opening formed for receiving said anchor member therethrough to attach said connector to said second building structural member, said concave seat member tapering towards said opening;

b. a first side member integrally connected to said concave seat member;

c. a second side member integrally connected to said concave seat member;

d. a back member integrally connected to said first and second side members and said concave seat member, said back member being formed to interface with said fastener means to attach said back member to said first building structural member; and e. an n-shaped, substantially rigid washer member located proximate said concave seat member and formed with a receiving portion having an opening for receiving said anchor member therethrough, said receiving portion dimensioned to closely fit between said first side member and said second side member to provide lateral bracing when said connector is under tension loads, said receiving portion formed with a back edge and with a back flange integrally connected to said back edge and extending towards said concave seat member, said back flange formed with a back flange base that is formed to be in registration with said concave seat member, said receiving portion also being formed with an outward edge and with an outward flange integrally connected to said outward edge of said receiving portion and extending towards said concave seat member, said outward flange formed with an outward flange base that is formed to be in registration with said concave seat member.

11. A connector for connecting a first building structural member to a second building structural member in conjunction with fastener means and an anchor member, said connector comprising:

a. a concave seat member, having a lowest point and a midpoint, said concave seat member being formed with an opening substantially at said lowest point of said concave seat member which is also substantially said midpoint of said concave seat member, said opening formed for receiving said anchor member therethrough to attach said connector to said second building structural member, said concave seat member tapering towards said opening;

b. a first side member integrally connected to said concave seat member;

c. a second side member integrally connected to said concave seat member; and d. a back member made out of metal integrally connected to said concave seat member and said first and second side members by drawing the metal of said back member to form said concave seat member and said first and second side members, said back member being formed to interface with said fastener means to attach said back member to said first building structural member.

12. The connector of claim 11, comprising:

a substantially rigid washer member located proximate said concave seat member and formed with a receiving portion having an opening for receiving said anchor member therethrough.

13. The connector of claim 12, wherein:

said receiving portion of said washer member is dimensioned to closely fit between said first side member and said second side member to provide lateral bracing when the connector is under tension loads.

14. The connector of claim 13, wherein:

said washer member has a base formed to be in registration with said concave seat member.

15. In a building, a connection between a first building structural member and a second building structural member, said connection comprising:

a. said second building structural member;

b. an anchor member received by said second building structural member, said anchor member including;
  (1) an anchor bolt having a distal end and a proximal end, said proximal end formed with a threaded portion, said distal end received by said second building structural member such that said anchor bolt is fixed relative to said second building structural member, and
  (2) a holding means releasably attached to said threaded portion of said proximal end of said anchor bolt;

c. a connector receiving said proximal end of said anchor bolt, said connector including;
  (1) a concave seat member, having a lowest point and a midpoint, said concave seat member being formed with an opening substantially at said lowest point of said concave seat member which is also substantially said midpoint of said concave seat member, said concave seat member tapering towards said opening, and said opening receiving said proximal end of said anchor bolt with said holding means preventing movement of said concave seat member past said holding means and off said proximal end of said anchor bolt; and
  (2) a first side member connected to said concave seat member,
  (3) a second side member connected to said concave seat member, and
  (4) a back member connected to said first and second side members;

d. said first building structural member located proximate said back member of said connector; and e. fastener means attaching said back member of said connector to said first building structural member such that said connector is fixed relative to said first building structural member.

* * * * *